United States Patent
Smarto et al.

(10) Patent No.: US 6,214,261 B1
(45) Date of Patent: Apr. 10, 2001

(54) METHOD FOR FORMING A MOLDED EDGE SEAL

(75) Inventors: John E. Smarto, Trafford; Jeffery B. Boley, Irwin; Donald Anthony, Lower Burrell, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/046,386

(22) Filed: Mar. 23, 1998

(51) Int. Cl.$^7$ ....................................................... B29D 11/00
(52) U.S. Cl. ........................... 264/1.7; 156/107; 264/2.5; 264/252; 264/511; 264/571
(58) Field of Search ............................. 349/190; 156/107, 156/285; 264/252, 510, 511, 1.1, 1.7, 2.5, 571; 359/265, 267

(56) References Cited

U.S. PATENT DOCUMENTS

| 4,174,152 | 11/1979 | Giglia et al. . | |
|---|---|---|---|
| 4,335,938 | 6/1982 | Giglia et al. . | |
| 4,361,385 | 11/1982 | Huang et al. . | |
| 4,478,991 | 10/1984 | Huang et al. ........................ | 526/287 |
| 4,554,318 | 11/1985 | Rukavina ............................. | 525/118 |
| 4,561,625 | * 12/1985 | Weaver ................................ | 264/252 |
| 4,609,703 | 9/1986 | Rukavina ............................. | 524/360 |
| 4,670,350 | 6/1987 | Rukavina ............................. | 528/520 |
| 5,081,520 | * 1/1992 | Yoshii et al. . | |
| 5,106,441 | 4/1992 | Brosig et al. . | |
| 5,141,678 | * 8/1992 | Blum ................................... | 264/1.7 |
| 5,243,453 | * 9/1993 | Kawaguchi et al. . | |
| 5,263,888 | 11/1993 | Ishihara et al. . | |
| 5,327,281 | 7/1994 | Cogan et al. ........................ | 359/270 |
| 5,433,810 | 7/1995 | Abrams .............................. | 156/273.7 |
| 5,471,338 | 11/1995 | Yu et al. ............................. | 359/273 |
| 5,632,936 | * 5/1997 | Su et al. .............................. | 264/2.5 |
| 5,668,663 | * 9/1997 | Varaprasad et al. ................. | 359/265 |
| 5,706,069 | 1/1998 | Hermens et al. . | |
| 5,798,813 | 8/1998 | Ohashi et al. . | |
| 5,825,527 | * 10/1998 | Forgette et al. ..................... | 359/267 |
| 5,828,435 | 10/1998 | Kato et al. . | |
| 5,969,847 | * 10/1999 | Coleman et al. .................... | 264/1.7 |
| 6,010,220 | * 1/2000 | Smarto . | |
| 6,033,518 | * 3/2000 | Backfisch . | |

OTHER PUBLICATIONS

Copending U.S. Patent application Ser. No. 08/955,788 entitled, "Method for Sealing a Laminated Electrochromic Device Edge", filed Dec. 22, 1997, by Charles R. Coleman, et al.

Copending U.S. Patent application Ser. No. 08/996,065 entitled, "Edge Design for Electrochromic Devices", filed Dec. 22, 1997, by John E. Smarto, et al.

Copending U.S. Patent application Ser. No. 08/970,031 entitled, "Suspension Lamination Method and Device", filed Nov. 13, 1997 by Charles R. Coleman, et al.

* cited by examiner

Primary Examiner—Mathieu D. Vargot
(74) Attorney, Agent, or Firm—William C. Mitchell; Carol A. Marmo

(57) ABSTRACT

A method for sealing the circumferential edge region of a laminated electrochromic device is disclosed. The method involves inserting a device to be sealed into a mold having a cavity aligned with the portion of the edge region to be sealed, and injecting a sealant into the cavity. Devices containing molded edge seals are also disclosed.

11 Claims, 11 Drawing Sheets

METHOD FOR FORMING A MOLDED EDGE SEAL

FIELD OF THE INVENTION

This invention is directed to a method for sealing an object prone to moisture gain or loss through its peripheral edge region and to the resulting edge-sealed object. In a preferred embodiment, the peripheral edge region of a laminated electrooptic device, for example an electrochromic lens, is sealed by inserting the device into a mold having a cavity aligned with the portion of the device prone to moisture gain or loss, and then injecting sealant into the cavity. After curing, an edge-sealed device is removed from the mold. Novel molds are also disclosed.

BACKGROUND OF THE ART

The optical properties of electrochromic materials change in response to electrically driven changes in oxidation state. Thus, when an applied voltage from an external power supply causes electrons to flow to (reduction) or from (oxidation) an electrochromic material, its transmittance properties change. In order to maintain charge neutrality, a charge balancing flow of ions in the electrochromic device is needed. By enabling the required electron and ion flows to occur, an electrochromic device utilizes reversible oxidation and reduction reactions to achieve optical switching.

Conventional electrochromic cells comprise at least one thin film of a persistent electrochromic material, i.e. a material which in response to the application of an electric field of given polarity, changes from a high-transmittance, non-absorbing state to a low-transmittance, absorbing or reflecting state. Since the degree of optical modulation is directly proportional to the current flow induced by the applied voltage electrochromic devices demonstrate light transmission tunability between high-transmittance and low-transmittance states. In addition, these devices exhibit long-term retention of a chosen optical state, requiring no power consumption to maintain that optical state. Optical switching occurs when an electric field of reversed polarity is applied.

To facilitate the aforementioned ion and electron flows, an electrochromic film which is both an ionic and electronic conductor is in ion-conductive contact, preferably direct physical contact, with an ion-conducting material layer. The ion-conducting material may be inorganic or organic, solid, liquid or gel, and is preferably an organic polymer. The electrochromic film(s) and ion-conductive material are disposed between two electrodes, forming a laminated cell.

When the electrode adjacent to the electrochromic film is the cathode, application of an electric field causes darkening of the film. Reversing the polarity causes reversal of the electrochromic properties, and the film reverts to its high-transmittance state. Typically, an electrochromic film, such as tungsten oxide is deposited on a substrate coated with an electroconductive film such as tin oxide or indium tin oxide to form one electrode. The counter electrode is typically a similar tin oxide or indium tin oxide coated substrate.

As a voltage is applied across the electrodes, ions are conducted through the ion-conducting material. To ensure reliable operation, the ion-conducting material layer generally must be sealed so as to maintain its water content within a range sufficient to provide required ion conductivity. Absent an adequate seal, moisture loss or gain from/to the ion-conducting material layer may adversely impact performance. The instant invention addresses this need by providing a molded edge seal that impedes moisture ingress and egress to/from the circumferential edge region of a laminated device, particularly a laminated electrochromic device.

U.S. Pat. No. 4,174,152 to Giglia, et al., discloses electrochromic devices wherein the polymeric electrolyte material is a hydrophilic copolymer of a selected acrylate or methacrylate monomer and a selected acid group containing a monomer, such as 2-acrylamido-2-methylpropanesulfonic acid.

U.S. Pat. No. 4,335,938 to Giglia discloses electrochromic devices having a layer of tungsten oxide in contact with a layer of organic electrolyte resin comprising a hydrophilic layer of 2-acrylamido-2-methylpropanesulfonic acid homopolymer and an electrode means for changing electrochromic properties of the device.

U.S. Pat. No. 5,433,810 to Abrams discloses a method and device for bonding composite eyeglass lenses. This reference is silent regarding sealing the edges of composite lenses.

U.S. Pat. Nos. 4,361,385 and 4,478,991 to Huang, et al., disclose electrochromic devices having a layer of electrochromic tungsten oxide in contact with a polymeric electrolyte wherein the stability and speed of the device are improved by using a copolymer of 2-acrylamido-2-methylpropanesulfonic acid and vinyl sulfonic acid as the polymer electrolyte. The polymer mixture is cast, dried and hydrated in contact with the electrochromic film, and then a second electrode consisting of paper-carbon is pressed against the polymer layer with a second tin oxide-coated glass plate backing the carbon-paper electrode.

U.S. Pat. Nos. 4,554,318; 4,609,703 and 4,670,350 to Rukavina disclose copolymers of acrylic acid and cyanoethylacrylate, including terpolymers with hydroxyethylacrylate, useful as primers for bonding metal-containing coatings to organic polymer substrates.

U.S. Pat. No. 5,471,338 to Yu, et al., discloses lamination of two coated plastic substrates using a layer of polymer which bonds with both coated surfaces to form a composite. Homo and copolymers of 2-acrylamido-2-methyl propyl sulfonic acid (AMPSA) form the ion-conducting polymer layer and are cured using actinic radiation, preferably (UV) light. AMPSA/N,N-dimethylacrylamide (DMA) polymers are preferred, and benzoin methyl ether and diethoxyacetophenone are disclosed as UV initiators.

U.S. Pat. No. 5,327,281 to Cogan discloses the use of an epoxy to seal a cavity formed when a spacer is used to separate electrodes and contain a liquid electrolyte injected between the spaced electrodes. This patent does not disclose or suggest the novel edge seal method disclosed herein.

Copending and commonly assigned U.S. patent application Ser. Nos. 08/995,788 and 08/996,064, filed Dec. 22, 1997, describe electrochromic devices having nubbed edge regions and sealed edge grooves, respectively.

SUMMARY OF THE INVENTION

Many laminated objects and devices are prone to moisture gain or loss through their peripheral edge regions. For example, in a laminated device having a peripheral edge region situated between first and second expanse regions, the peripheral edge region many comprise a layer or surface which is a conduit for moisture transport. In the case of a laminated electrooptic device, such as a laminated electrochromic lens, the portion of the peripheral edge region prone to moisture transport is generally the peripheral or outer surface of an ion-conducting material layer. In this type of lens, the first and second expanse regions are the optical surfaces of the lens, which may be flat, simple or compound or complex curves (aspheric, bifocal, etc.).

This invention is directed to a method for edge-sealing a device prone to moisture ingress or egress through its peripheral edge region and to a device containing a molded moisture seal on its peripheral edge region. The instant method utilizes single or multiple piece molds to form the edge seals disclosed herein and is particularly useful when moisture gain or loss via the circumferential edge region of a device is critical to performance, as is generally the case with some electrooptic devices, including various electrochromic devices.

FIG. 1 illustrates an application where the circumferential edge region of a laminated device includes the outer surface of an ion-conducting material interlayer prone to moisture gain or loss. In this Figure, ion-conducting polymer interlayer 7 is disposed between substrates 1 and 2 to form laminated electrochromic device 8. Circumferential edge region 14 of device 8 includes outer surface 9 of ion-conducting polymer (ICP) interlayer 7 which is situated between the outer surfaces of substrates 1 and 2. Molded edge seal 10 restricts moisture gain or loss to/from outer surface 9 of polymer layer 7.

In accordance with one embodiment of the instant method, circumferential edge region 14 of device 8, or a portion thereof, is sealed by inserting device 8 into a mold, such as single piece mold 20 shown in FIG. 5, and injecting a suitable sealant into mold cavity 22 to form molded edge seal 10 (FIG. 2). Mold cavity 22 is contiguous with outer surface 9 of polymer interlayer 7 and is preferably shaped to provide a raised or apex-shaped edge seal 10 on edge region 14 of device 8.

By covering outer surface 9 of polymer interlayer 7, molded edge seal 10 enables the water content of ICP interlayer 7 to be maintained within a suitable range. This in turn helps to maintain the ion-mobility of the polymer. As shown in FIG. 2, the apex shape of molded edge seal 10, which protrudes from edge region 14 of device 8, assists in mechanically affixing device 8 to eyewear frame 12 and imparts structural integrity to device 8, particularly when interlocked with nub 11. Molded edge seal 10 can also serve as an electrical insulator in certain applications.

DETAILED DESCRIPTION OF THE INVENTION

Figure 1:
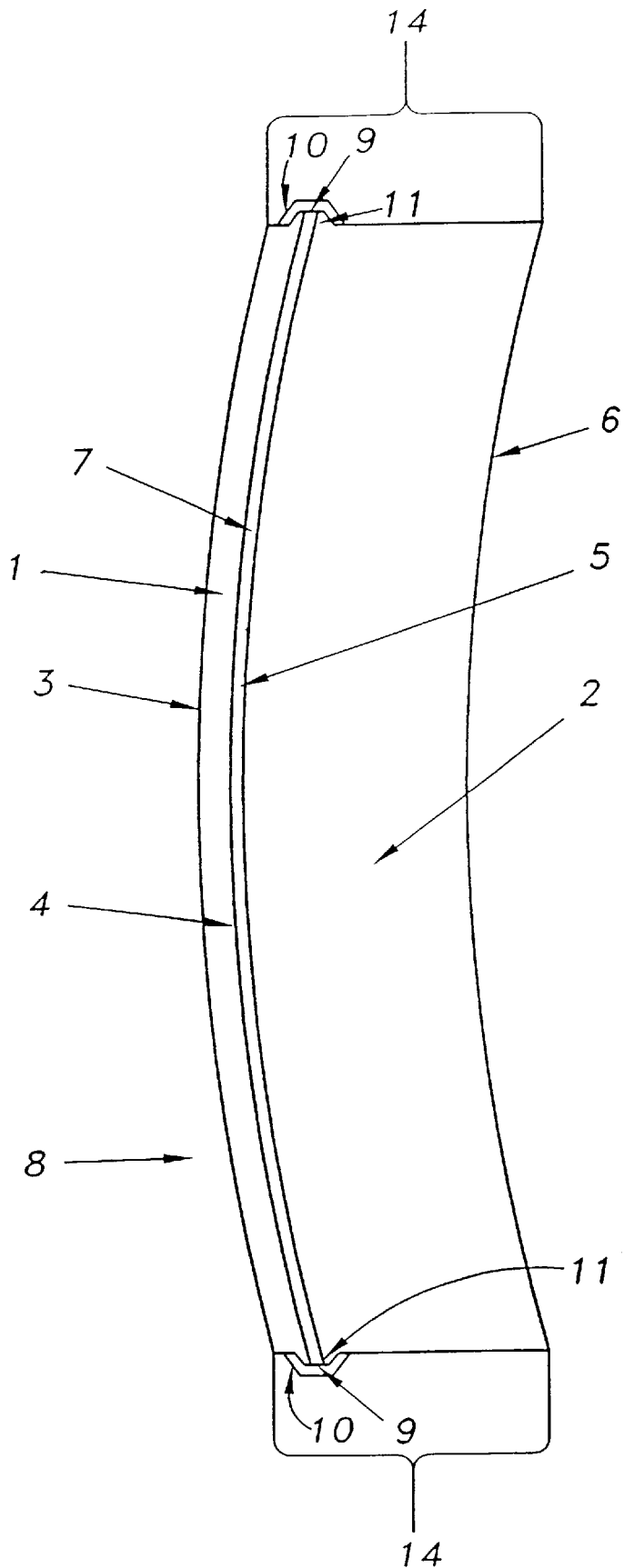
FIG. 1 is a cross-sectional side view of a laminated lens showing the molded edge seal of the instant invention.

Other than in the operating Examples, or where otherwise indicated, all numbers quantifying ingredients, amounts, dimensions, ratios, ranges, reaction conditions, etc., used herein are to be understood as modified in all instances by the term 'about'.

In its broadest sense, the instant invention is directed to a method for sealing an object prone to moisture gain or loss through some portion of its peripheral edge region, which method comprises: a) inserting said object into a mold having a mold cavity which can be aligned with or is capable of covering the portion of said object's peripheral edge region prone to moisture gain or loss; b) if necessary, aligning the portion of said peripheral edge region prone to moisture gain or loss with said mold cavity; c) adding an effective amount of a sealant to said mold cavity; d) allowing said sealant to cure for an effective cure time; and e) removing said object from said mold. The unsealed object is generally inserted into a mold so that the mold cavity is aligned or contiguous with, i.e., covers, the portion of the object's peripheral edge region prone to moisture gain or loss. If this is not accomplished during the insertion step, alignment or adjustment is necessary.

In another embodiment, the instant invention is directed to a method for sealing a laminated electrooptic device having a peripheral edge region situated between the expanse regions of first and second laminated substrates, wherein said peripheral edge region comprises the outer surfaces of said first and second substrates and the outer surface of an interlayer which is prone to moisture gain or loss, such as the outer surface of an ion-conducting material interlayer, which method comprises: a) inserting said laminated electrooptic device into a mold having a mold cavity so as to align said outer surface prone to moisture gain or loss with said mold cavity; b) adding an effective amount of a sealant to said mold cavity, preferably by injecting said sealant into said mold cavity via an injection means, thereby contacting said sealant with said outer surface prone to moisture gain or loss; c) curing said sealant for an effective cure time; and d) removing said device from said mold.

As used herein, the term 'effective cure time' refers to the time required for a sealant to become sufficiently rigid to allow removal of the sealed device from the mold without substantially changing or distorting the sealant profile. The term 'effective amount' refers to the quantity of sealant necessary to meet a given sealing objective. Typically, sufficient sealant is added to fill the mold cavity. Curing can be completed either inside or outside of the mold. Single or multiple piece molds can be used; split molds are preferred.

When an unsealed object is properly inserted in a mold, the mold cavity is contiguous with and covers the portion of the object's peripheral edge region prone to moisture gain or loss. As sealant fills the mold cavity, it contacts, adheres to and seals the moisture-sensitive portion of the object. In the case of a laminated electrochromic device, this means that sealant injected into a mold cavity contacts the outer surface of an ion-conducting polymer (ICP) interlayer. The mold cavity is shaped to provide the desired sealant profile; preferably, the sealant forms a raised seal, or apex, on the edge region of the device being sealed. If the edge region of the device being sealed contains a peripheral nub which is contiguous with the outer surface of its ICP interlayer, the mold cavity can be designed to encompass this nub, thereby allowing the nub to interlock with an apex-shaped, molded edge seal and improving the structural integrity of the device. The sealant adheres to the device but not the mold. After curing, the mold is separated from the device, resulting in a device having a molded edge seal.

The instant sealing method is applicable to single stack electrochromic devices, wherein electrodes, electrochromic material(s) and an ion-conducting material are coated as a single stack on a first substrate, which is then laminated to a second substrate, as well as to devices wherein the electrodes are coated on first and second substrates. This invention also applies generally to electrooptic devices. As used herein, electrooptic devices include those devices containing an electrooptic medium or component which is sensitive to moisture gain or loss. Examples include various liquid crystal, electrophoretic and suspended particle devices.

The instant invention is also directed to novel objects or devices, preferably laminated electrooptic devices, prepared by the instant method. More particularly, this invention is directed to an object having a molded moisture seal covering the portion of its peripheral edge region prone to moisture gain or loss. A preferred device is a laminated electrooptic device having a peripheral edge region prone to moisture gain or loss through the outer surface of an ion-conducting material interlayer, wherein said peripheral edge region contains a molded edge seal in contact with said outer surface.

In a preferred embodiment of this invention, a molded edge seal is interlocked with a nub on the peripheral edge region being sealed. As used herein, the term 'nub' refers to any circumferential protruberance, bump, etc., formed on the peripheral edge region of a substrate by a conventional edging technique. For example, a nub can be formed by shaping, molding, cutting or edging one or both of the substrates comprising a laminated electrochromic device. See, for example, copending application Ser. No. 08/995, 788, which is incorporated herein by reference in its entirety.

The preferred laminated electrochromic devices of this invention contain an ion-conducting material interlayer disposed between first and second device substrates. These polymer interlayers are generally prone to moisture gain or loss. Various ion-conducting materials can be used, including for example, materials comprising hydrogen uranyl phosphate or polyethylene oxide/$LiClO_4$. Also, ion-conducting polymer electrolytes or inorganic films such as $LiNbO_3$, $LiBO_3$, $LiTaO_3$, $LiF$, $Ta_2O_5$, $Na_2AlF_6$, $Sb_2O_5$ $nH_2O+Sb_2O_3$, $Na_2O\ 11Al_2O_3$, $MgF_2$, $ZrO_2$, $Nb_2O_5$ and $Al_2O_3$ can be used as the ion-conducting material. Preferred ion-conducting materials are ion-conducting polymers; these polymers generally serve the dual functions of being ion-conducting electrolytes and mechanical adhesives. One class of suitable ion-conducting materials includes ion-containing polymers known as ionomers. These macromolecules contain ionizable groups covalently linked to a polymer chain, typically a hydrocarbon. Polystyrene sulfonic acid and poly (2-acrylamido-2-methyl-1-propanesulfonic acid) are examples of ionomers, both incorporating the protonic acid $SO_3H$ group on the polymer chain. Ionomers are generally formed by polymerizing monomers bearing an ionizable group and also a C=C vinylic group.

In accordance with a preferred embodiment of the present invention, the ion-conducting polymer electrolyte is a proton-conducting polymer selected from the group consisting of homopolymers of 2-acrylamido-2-methylpropanesulfonic acid (AMPSA) and copolymers of AMPSA with various monomers. Such polymers may be utilized in the form of preformed sheets which are laminated between the substrates, or in the form of liquid reaction mixtures of monomers which are cast and cured in place between the substrates. A preferred proton-conducting polymer electrolyte in accordance with the present invention is a copolymer of AMPSA and N,N-dimethylacrylamide (DMA), preferably cast and cured in place. More preferred copolymers of AMPSA and DMA are prepared from AMPSA and DMA monomers in a molar ratio range of about 1:3 to 1:2. The thickness of the polymer electrolyte is not believed to be critical but in general is in the range of 0.001 to 0.025 inch (0.0254 to 0.625 millimeters).

The first and second substrates of the instant laminated devices are generally glass or organic polymeric substrates conventionally used to prepare electrochromic articles or devices. Preferably, polymeric organic substrates are used. Substrates to which the sealing method of the present invention applies are preferably prepared from transparent materials suitable for producing eyewear lenses, such as lenses prepared from synthetic organic optical resins. Alternatively, the substrate can be a non-transparent solid material.

Suitable transparent lens may have a conventional refractive index (1.48–1.5), a relatively high refractive index (1.60–1.75), or a mid-range refractive index (1.51–159), depending on the end use. In general terms, the transparent lens may have a refractive index within the range of between 1.48 and 1.75, e.g., from about 1.50 to about 1.8.

Synthetic polymer substrates that may be used as a lens material include, but are not limited to: thermoplastic polycarbonates, such as the carbonate-linked resin derived from bisphenol A and phosgene, which is sold under the trademark LEXAN; polyesters, such as the material sold under the trademark, MYLAR; poly(methylmethacrylates), such as the material sold under the trademark, PLEXIGLAS; and polymerizates of a polyol (allyl carbonate) monomer, especially diethylene glycol bis(allyl carbonate), which is sold under the trademark CR-39®. Copolymers of the aforedescribed monomers/resins may also be used as a lens material. These and other transparent and non-transparent polymeric substrates known in the art for use for various optical and non-optical applications may be used.

After lamination, preferred laminated electrochromic devices comprise an ion-conductive polymer sandwiched between two coated substrates containing appropriate electroconductive and electrochromic films. Absent an edge seal, the ion-conducting material is exposed to the environment along the circumferential edge region of the laminate. To reduce moisture transfer into or out of this layer, it is desirable to seal the edge of the lens via the instant method prior to installation into a holding device such as an eyewear frame.

Any sealant which impedes moisture transport, which adheres to the device being sealed and which is capable of being applied via the instant molding technique to the peripheral edge region of a laminated device can be used. Curing of the sealant is generally necessary. Suitable sealants for sealing the edges of electrochromic devices via the instant method include, but are not limited to, epoxy resins, particularly those that adhere strongly to glass and/or organic substrates. As used herein, "epoxy resins" refer to those resins characterized by the presence of an epoxy or oxirane ring. Such resins may contain aliphatic, cycloaliphatic or aromatic backbones. Though cure times and temperatures are not critical to the instant invention, preferred epoxies have cure times of about 0.5 min. to about 24 hours, and are cured at temperatures between about 40°

F. and 300° F. The epoxies provide an impediment to moisture ingress and egress and impact structural integrity to laminated devices.

Typically, epoxies are formed by combining a resin component with a hardener Relative to the instant method, the hardener and resin are preferably mixed immediately prior to injection into a mold cavity. A suitable epoxy for use as a sealant in the instant method is Araldite® 2012, which is commercially available from Ciba Geigy Corporation.

The edge seal takes the shape of the mold cavity. Preferably, the seal is formed in the shape of an apex around the periphery of the device to be sealed. In the case of electrochromic lenses, this shape facilitates attachment of the lenses to a suitable frame, particularly when the frame is shaped to receive the apex in a corresponding groove.

The instant invention is now described via reference to the Figures. FIG. 1 shows a cross-section of laminated device 8 containing ion-conductive polymer (ICP) interlayer 7. In this figure, coated substrate 1 is the front lens of laminated electrochromic device 8. This front lens 1 has a front expanse surface 3 and a coated rear mating surface 4. The coatings on rear mating surface 4, which are not shown, are conventional coatings used in the preparation of electrochromic lenses and are not critical to the instant invention. Laminated to substrate 1 is substrate 2, which is the rear lens. Rear lens 2 has a coated front mating surface 5 and a rear expanse surface 6. The coatings on surface 5, which are not shown, are conventional coatings used in the preparation of electrochromic lenses and are not critical to the instant invention. Ion-conducting polymer (ICP) interlayer 7 is disposed between substrates 1 and 2; this interlayer serves as both an ion-conducting electrolyte and a mechanical adhesive which bonds substrates 1 and 2. Edge region 14 of laminated lens 8 contains outer surface 9 of ion-conducting polymer interlayer 7.

Because ICP interlayer 7 is prone to moisture gain or loss through outer surface 9, it is desirable to seal outer surface 9 to maintain the water content of ICP 7 near its original water content. This helps to maintain required ionic conductivity. Water gain to and water loss from the ICP can be restricted by sealing outer surface 9 of polymer interlayer 7 on edge region 14 of device 8. The initial water content of polymer interlayer 7 generally depends on the ion-conducting material used in the manufacture of device 8 and is not critical to the instant invention.

Figure 2:
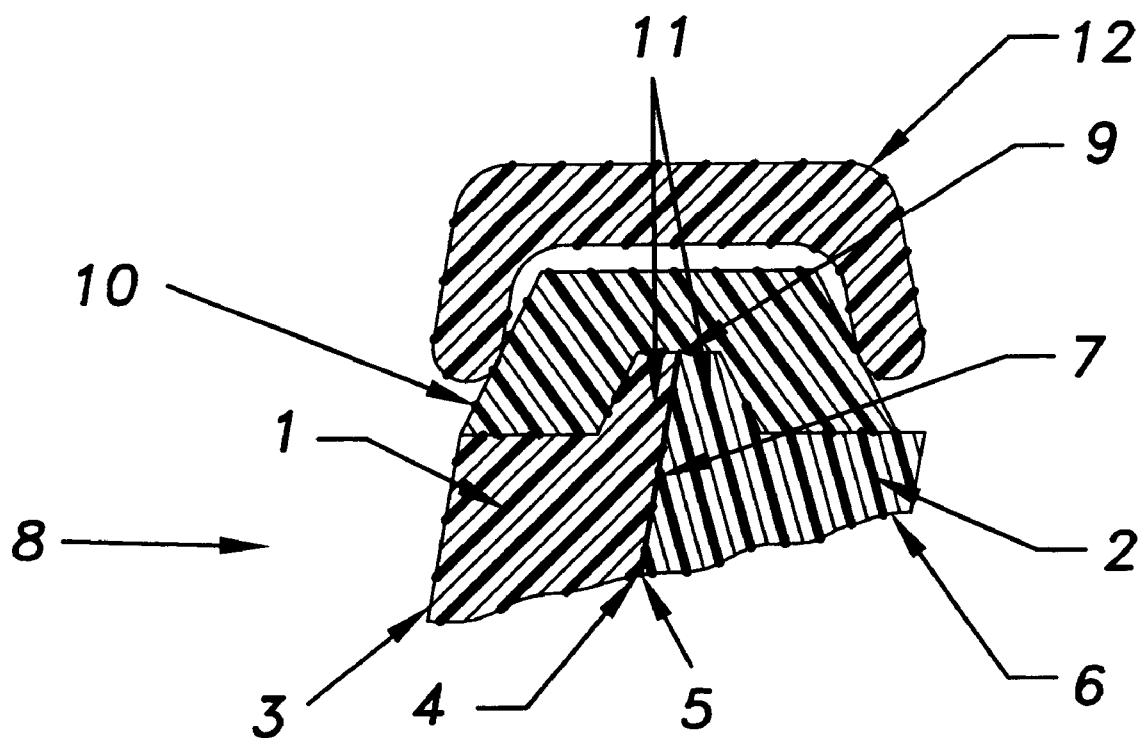
FIG. 2 is a cross-sectional blow-up of a laminated lens edge showing the molded apex edge seal of the present invention, in conjunction with an eyewear frame.
Figure 5:
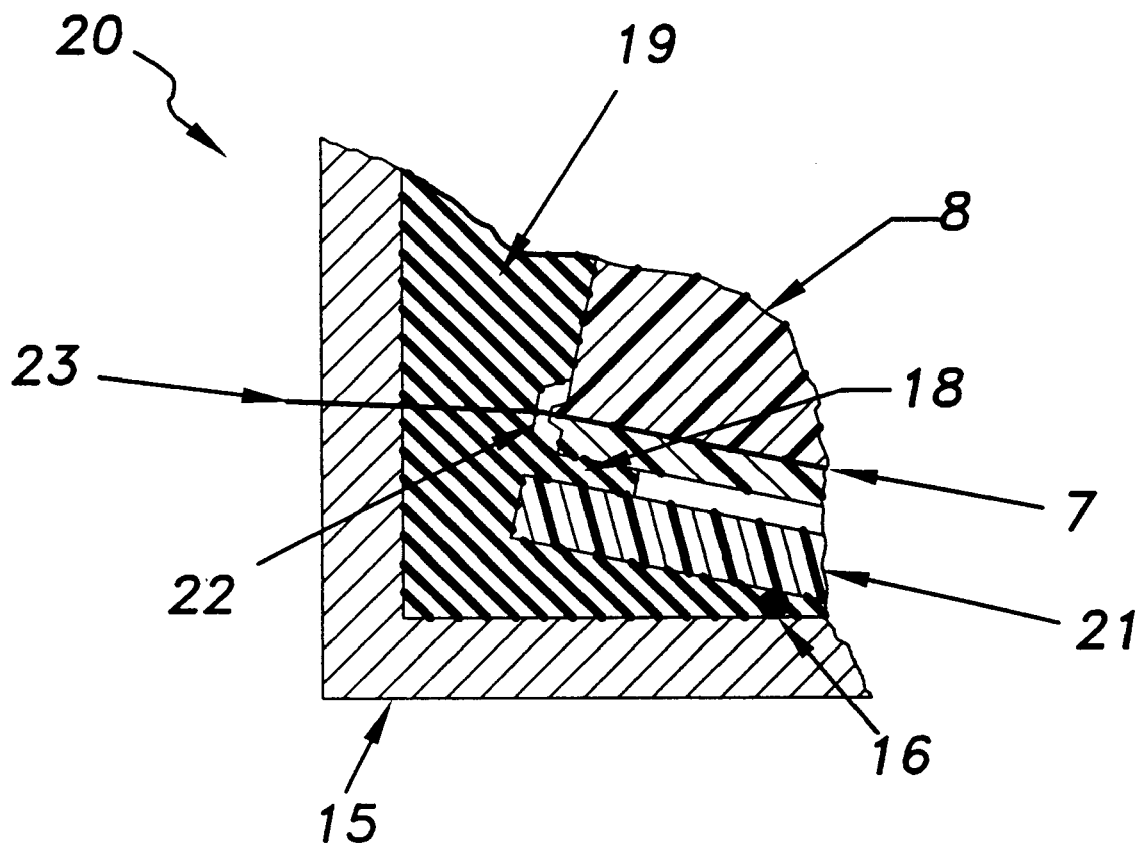
FIG. 5 is a cross-section showing a single piece mold containing a lens to be sealed and a mold cavity.
Figure 9:
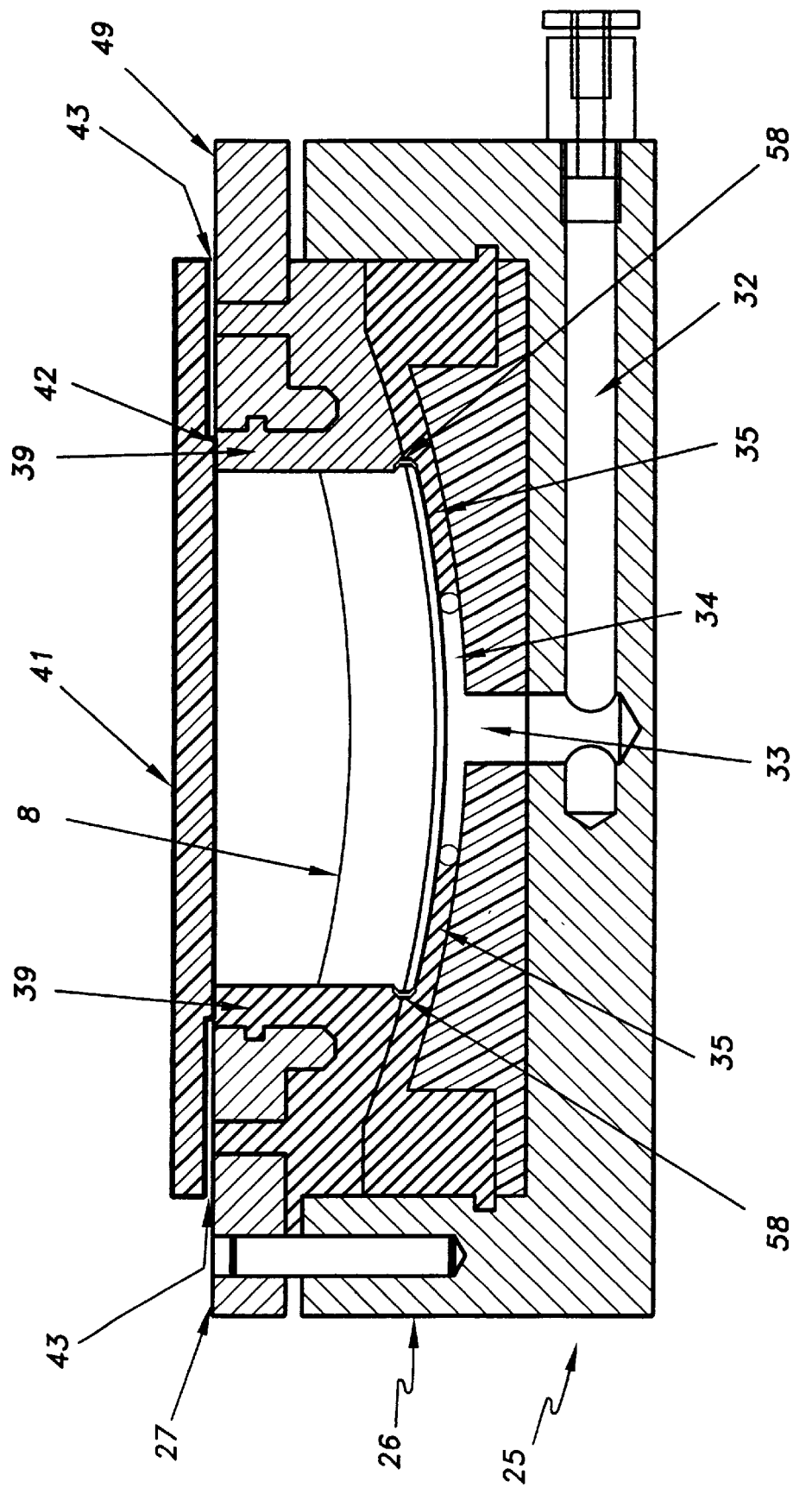
FIG. 9 is a cross-section of a split mold containing a lens to be sealed.

As shown in FIG. 2, molded edge seal 10 seals outer surface 9 of ICP interlayer 7. Molded edge seal 10 can be formed by various embodiments of the instant invention. As shown in FIG. 5, one embodiment involves inserting laminated device 8 into single piece mold 20 so as to align mold cavity 22 with outer surface 9 on peripheral edge region 14. As shown in FIG. 9, split molds can also be used. Split molds are preferred for reasons described hereinafter.

Referring again to FIG. 5, laminated device 8 is inserted into mold 20 and a suitable sealant, preferably an epoxy sealant such as Araldite® 2012, is injected into mold cavity 22. Hardener/resin mixing and injection of the epoxy can be accomplished by means well known in the art. The sealant flows around the periphery of the device filing mold cavity 22. After mold cavity 22 is filled, curing is permitted to the extent necessary. Device 8, complete with a molded moisture seal on peripheral edge region 14, is then removed from mold 20.

As shown in FIG. 2, substrates 1 and 2 preferably are edged so as to provide nub 11 which is contiguous or aligned with outer surface 9. During molding, nub 11 interlocks with molded edge seal 10, which helps to prevent delamination due to frame loading. The outer faces of molded edge seal 10 preferably form a bevel that mates with a groove in frame 12; this allows for small variances in lens size and laminate alignment while facilitating attachment of lens 8 to frame 12.

Mold fabrication of a single piece mold is now described. Initially, mold master lens 13 is prepared by edging a blank lens to a shape which corresponds to the shape of the lens to be sealed (e.g., device 8), except that it also encompasses the shape of the cavity into which the sealant will be injected.

To provide optimal mold sealing, a mold must be compliant enough to seal against lens 8, yet stiff enough to maintain the desired shape of molded edge seal 10. A preferred method of striking this balance involves use of composite single piece or split molds.

Figure 3:
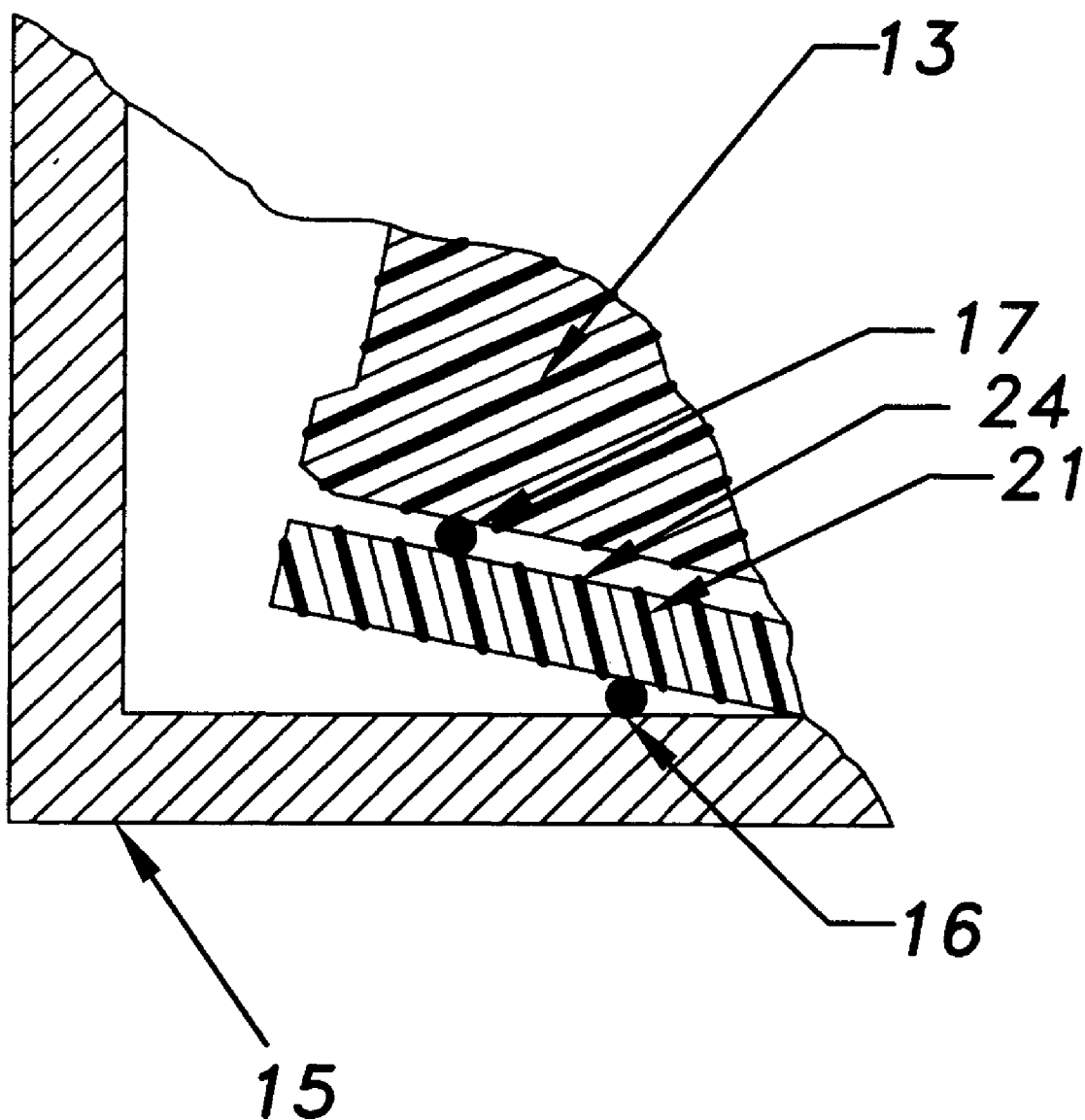
FIG. 3 is a cross-section of a single piece mold precursor showing its base, mold master lens and foundation lens.

Single piece mold 20 is prepared by bonding or securing foundation lens 21 onto mold base 15 as shown in FIG. 3. Mold base 15 can be prepared from any material of construction having sufficient rigidity; plastic, ceramic, glass or metal substrates are suitable. Mold base is serves as a casting container used to hold pliable portion 19 of single piece mold 20. Preferably, mold base 15 is prepared from aluminum.

Upper surface 24 of foundation lens 21 has substantially the same curvature as expanse surface 3 of laminated device 8 and can be prepared from any material having suitable rigidity. Foundation lens 21 preferably rests on a support means, such as "O"-ring 16. "O"-ring 16 is bonded to mold base 15 by a suitable bonding means (not shown), and foundation lens 21 is then bonded to "O"-ring 16 and/or base 15 via a suitable adhesive (not shown). A spacing means such as a second "O"-ring 17 separates mold master lens 13 and foundation lens 21, with about a $\frac{1}{16}$" to $\frac{1}{10}$" (1.6 to 2.5 mm) gap between these lenses being preferred. Spacing means 17 is bonded to upper surface 24 of foundation lens 21 via a suitable bonding agent (not shown), and mold master lens is lightly bonded via a suitable adhesive (not shown) to spacing means 17.

Figure 4:
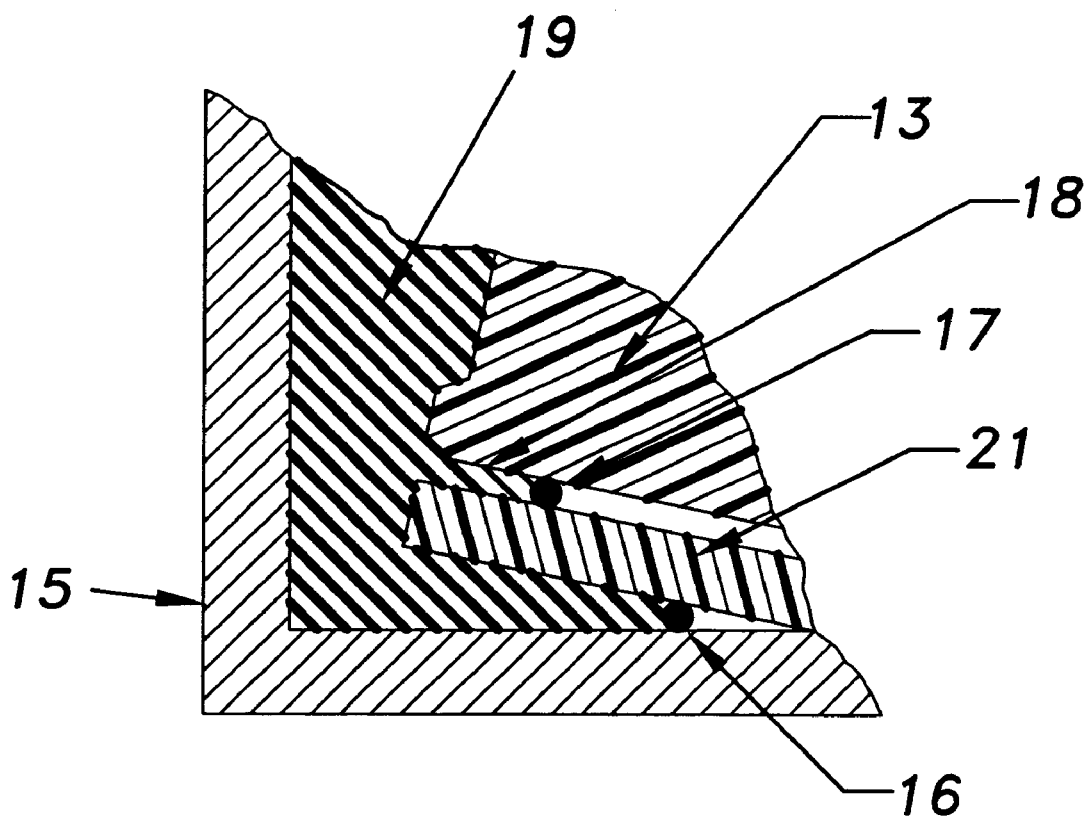
FIG. 4 is a cross-section showing a single piece mold containing a mold master lens.

As shown in FIG. 4, a suitable mold material, such as a silicone rubber, is then cast into mold base 15 to form pliable portion 19 of mold 20. The mold material substantially surrounds mold master lens 13 and fills the gap (up to spacing means 17) between mold master lens 13 and foundation lens 21 to form support ledge 18. The mold material also flows beneath foundation lens 21 up to support means 16, and foundation lens 21 remains as an integral part of composite mold 20. Support ledge 18 provides a seal to prevent leakage of sealant on to surface 3 of device 8 during the sealant injection step of the instant method.

Various silicone rubbers can be used to form pliable portion 19 of mold 20. For example, MRTV silicone rubber, which is commercially available from Dow-Corning Corporation, is acceptable. This material has a Shore A durometer hardness of 60. Generally, Shore A durometer hardness values ranging from about 40 to about 80 can be used. After mold material 19 is added to mold base 15, it is allowed to cure for an effective cure time. Generally, curing occurs in accordance with the manufacturer's instructions. Mold master lens 13 is then removed and excess molding material 19 (e.g., flash) is trimmed. Mold support ledge 18 may also be trimmed; minimally, about a $\frac{1}{8}$" (3 mm) wide ledge should be maintained.

Mold 20 prepared as described above is shown in FIG. 5 and is suitable for edge sealing. Laminated device 8 generally corresponding in shape to master mold lens 13 is inserted into mold 20. Rear surface 6 of laminated device 8 faces upward, and a downward pressure is preferably applied to this surface, for example by a vertical pneumatic, mechanical or electric cylinder device. This force seals front expanse surface 3 of device 8 against support ledge 18. When properly inserted, outer surface 9 of device 8 is aligned with cavity 22 of device 8. If pliable portion 19 of mold 20 is removed from mold base 15 before the sealant injection step, it is desirable to also exert pressure on the vertical peripheral wall of pliable portion 19 to help seal the mold against device 8. For example, pliable portion 19 can be compressed against device 8 via use of one or more rubber bands to minimize leakage of sealant during the injection step.

A suitable sealant is added to cavity 22. Preferably, the sealant is injected into cavity 22 via an injection means (not shown) through injection conduit 23. Conduit 23 is inserted through mold 20 into cavity 22. The sealant flows around the periphery of laminated device 8, filling cavity 22. An outlet conduit (not shown in FIG. 5) is also inserted into cavity 22 of mold 20 to assist the injection process. This conduit, which is preferably located opposite conduit 23, facilitates gas removal as the sealant fills cavity 22. Preferably, vacuum is drawn on the outlet conduit to further speed the injection process by 'pulling' sealant through cavity 22. Needles can be used as the inlet and outlet conduits.

Figure 8:
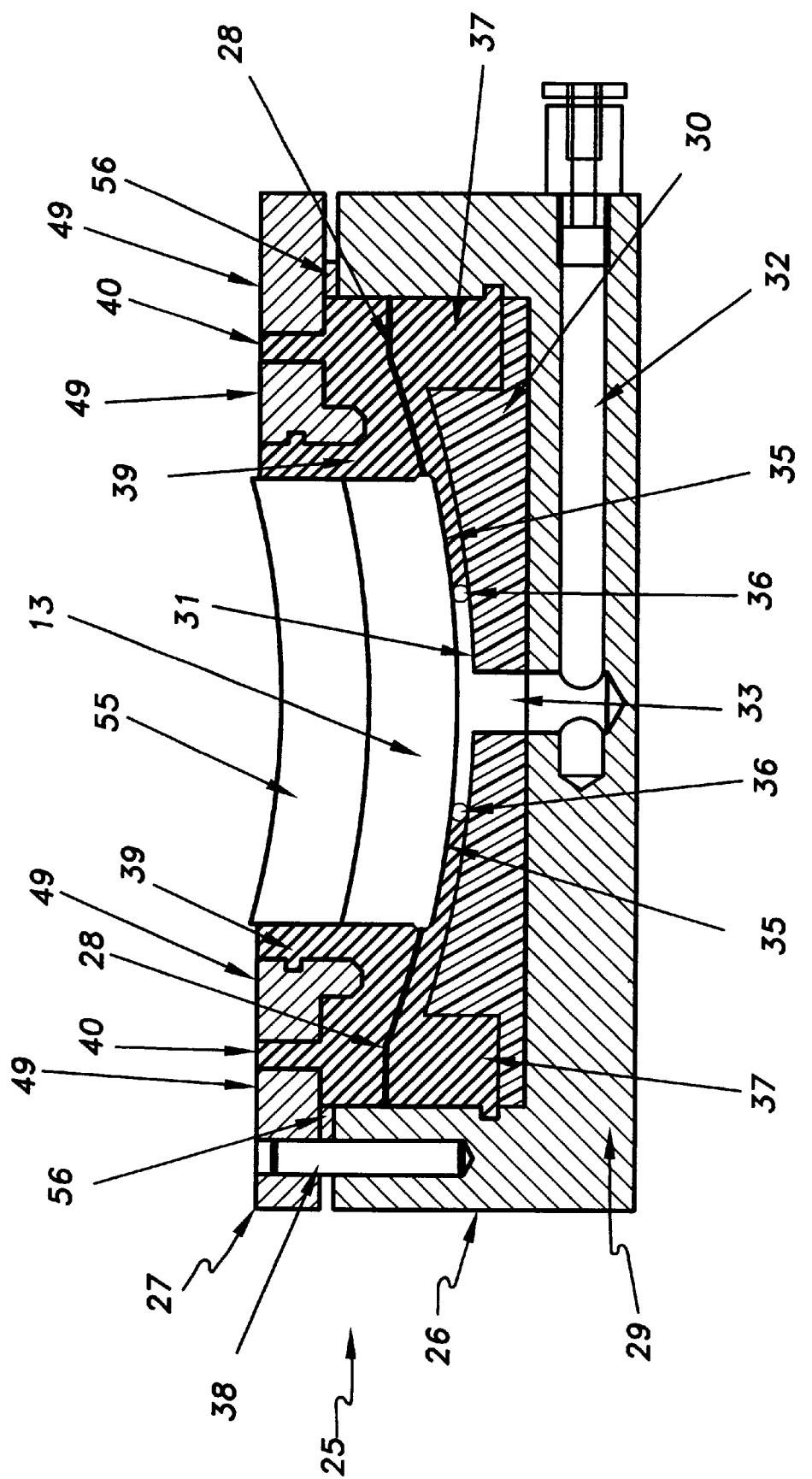
FIG. 8 is a cross-section of a split mold containing a mold master lens.

A preferred embodiment of the instant invention involves use of a split mold. As shown in FIG. 8, split mold 25 comprises bottom portion 26 and top portion 27, which are separated along split line 28. Split line 28 is preferably a three dimensional curve which intersects the device being sealed at the center line of its edge seal. Bottom portion 26 comprises split mold base 29, mold insert 30 and pliable portion 37. Split mold base 29 and mold insert 30 can be prepared using any rigid material, such as plastic, ceramic, glass or metal. Aluminum is a preferred material of construction for split mold base 29 and mold insert 30. Mold insert 30 is bonded to split mold base 29 using a suitable bonding means (not shown). Top surface 31 of mold insert 30 has a concave shape which corresponds substantially with front expanse surface 3 of laminated device 8.

Split mold base 29 optionally but preferably contains vacuum passage 32, which is in fluid communication with vacuum passage 33 through mold insert 30. As shown in FIG. 9, vacuum passage 33 is in fluid communication with vacuum chamber 34, which is formed when device 8 is positioned in split mold 25 for sealing. Vacuum passage 32 is connected to a vacuum generator (not shown). The vacuum generator and passages 32 and 33 permit vacuum to be drawn on vacuum chamber 34, which helps to seal front expanse surface 3 of device 8 against support ledge 35. Vacuum sealing is also applicable to single piece molds.

Figure 6:
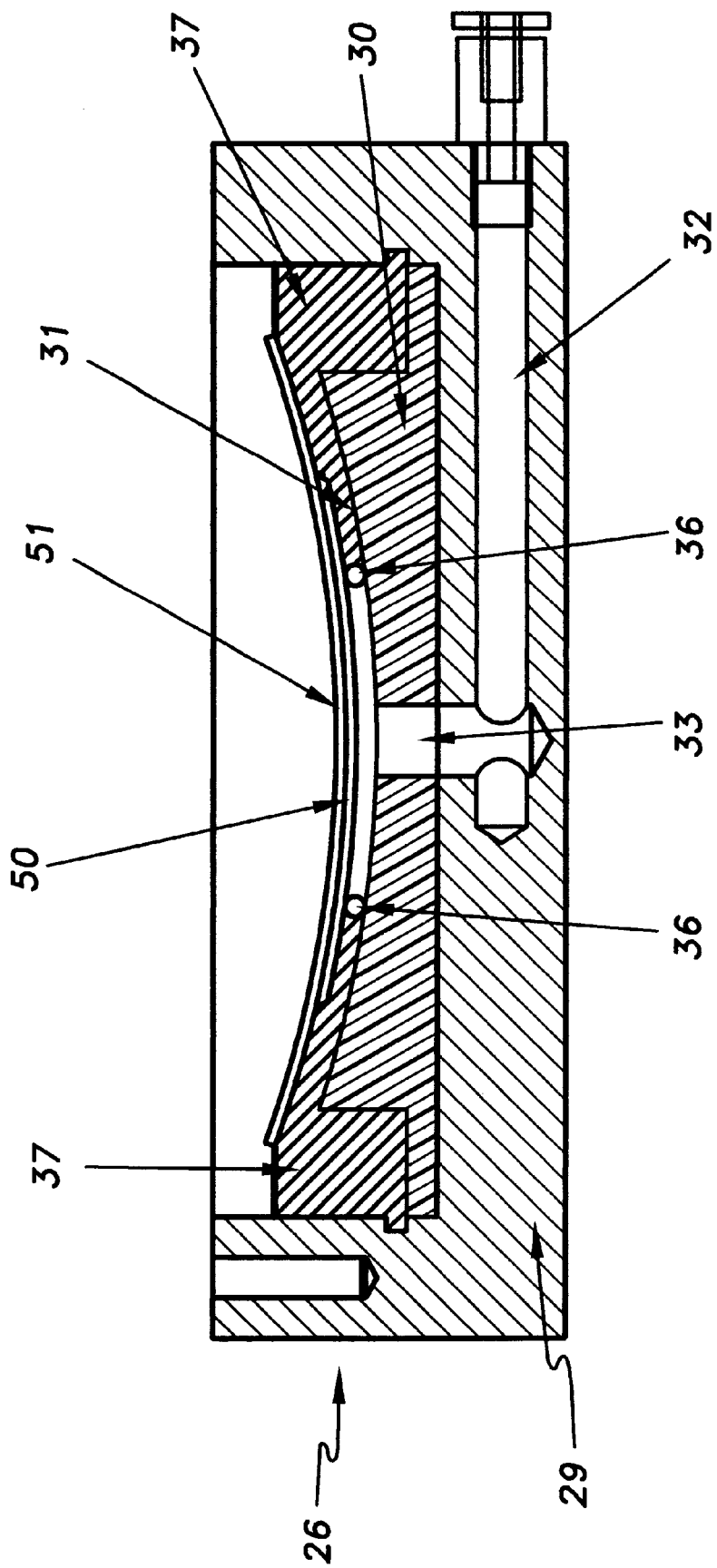
FIG. 6 is a cross-section of the bottom portion of a split mold.
Figure 7:
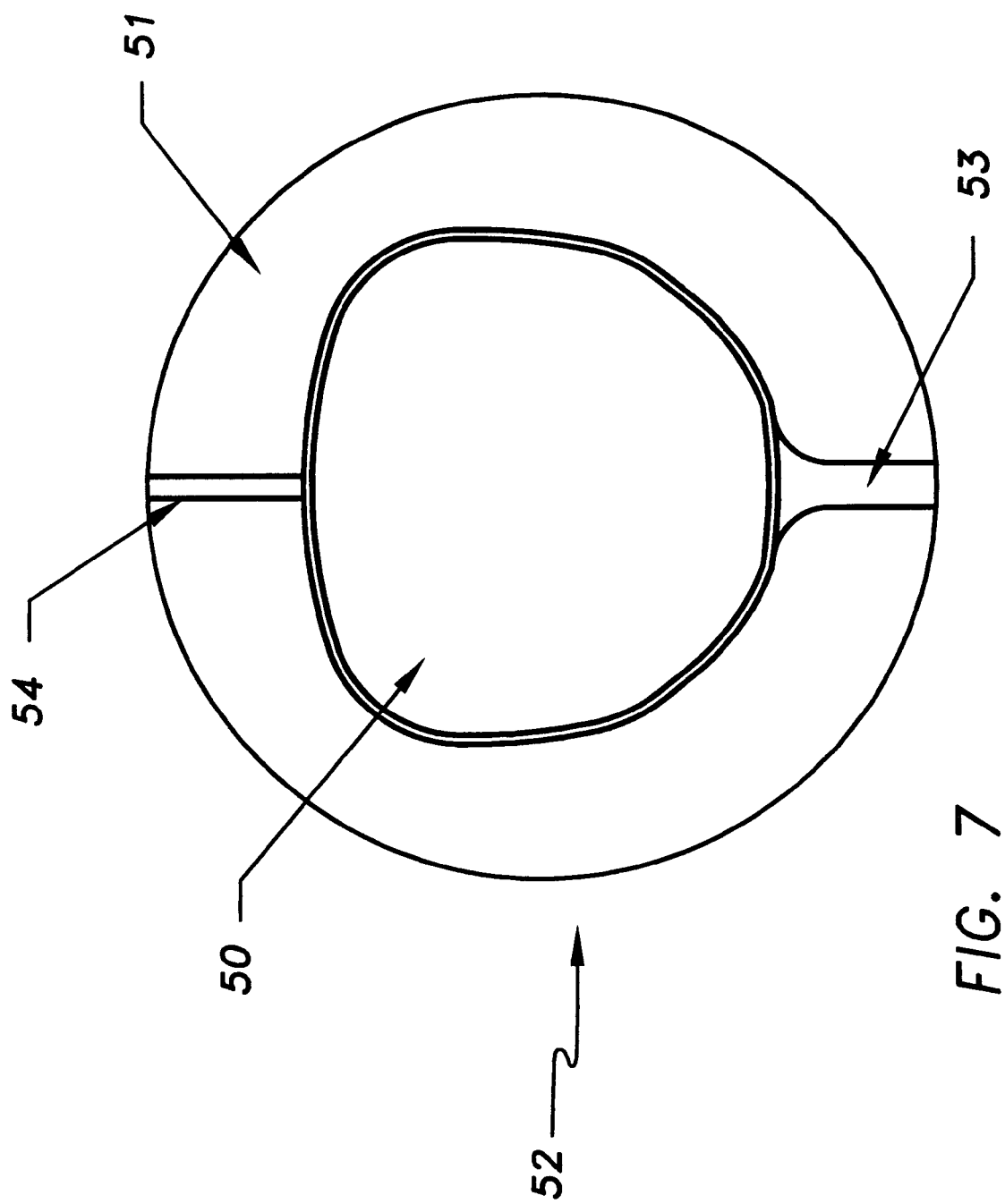
FIG. 7 is a bottom view of a casting lens assembly.

Bottom portion 26 is constructed by a first casting to form lower pliable portion 37. As shown in FIGS. 6 and 7, mold master plano lens 50, shaped to provide a suitable mold cavity relative to substrate 1 of device 8, is lightly bonded, for example via use of melted bees wax, to plano lens 51. Plano lens 51 may be round or shaped. This forms lens assembly 52 comprising lens 50 and lens 51, as shown in FIG. 7. Injection and outlet sprue molds 53 and 54, respectively, are then cut from bees wax and pressed onto the bottom of round uncut plano lens 51. Lens assembly 52 is lightly bonded to "O"-ring 36, which in turn is bonded to mold insert 30. "O"-ring 36 space master mold plano lens 50 approximately 1/16 to 1/10" (1.6 to 2.5 mm) from surface 31 of mold insert 30. A suitable mold material is then cast into split mold base 29 to form pliable portion 37. The mold material flows underneath lens assembly 52 up to "O"-ring 36, thereby forming support ledge 35. During casting, mold material is added to the level of the lower surface of plano lens 51. After allowing lower pliable portion 37 to cure for an effective cure time, lens assembly 52 is removed, completing preparation of bottom portion 26 of split mold 25. Sprue depressions and a depression corresponding to mold master plano lens 50 are left in pliable portion 37.

As shown in FIG. 8, top portion 27 of split mold 25 comprises mold cover 49 and upper pliable portion 39. Upper pliable portion 39 is prepared by placing mold master lens 13 onto support ledge 35 of bottom portion 26. Preferably, flat-edged semi-finished lens 55 is bonded via a suitable adhesive to the top surface of master mold lens 13 to extend the throat of the resulting mold master lens assembly above the top surface of mold cover 49, as shown in FIG. 8. Assembled lenses 13 and 55 are positioned so that the lower bevel of lens 13 fits into the beveled mold face of lower pliable portion 37. Thus, the lower bevel of lens 13 corresponds to the lower bevel of mold master piano lens 50. Mold cover 49 is then installed onto split mold base 29. Casting spacer 56 separates mold cover 49 and split mold base 29. One or more alignment pins 38 insure that mold cover 49 is properly oriented with respect to split mold base 29.

Mold material is then cast into the space between mold cover 49, assembled lenses 13 and 55 and lower pliable portion 37, as shown in FIG. 8. One or more breather holes 40 may be used to expedite the casting process. Mold material is preferably added to the level of the top surface of mold cover 49 and allowed to cure for an effective cure time, forming upper pliable portion 39. After upper pliable portion 39 cures, top half 27 and bottom half 26 are separated, and assembled lenses 13 and 15 are removed. A mold release agent such as Vaseline® is preferably applied to the top surface of lower pliable portion 37 prior to casting upper pliable portion 39. This helps to prevent sticking along split line 28.

As shown in FIG. 9, the molding process using split mold 25 begins by inserting laminated device 8 into bottom portion 26 of split mold 25, which positions front expanse surface 3 of device 8 on support ledge 35. Top portion 27 of split mold 25 is then installed over alignment pin(s) 38, and top plate 41 is preferably positioned onto mold cover 49. Top plate 41, which can be prepared from any suitable rigid material and is preferably prepared from transparent plastic, contains extended surface 42 on its bottom face. The shape of extended surface 42 corresponds with and rests on the top surface of upper pliable portion 39; this forms gap 43 between the non-extended portion of top plate 41 and the top surface of cover plate 49. Preferably, this gap is about 1 mm in width.

Figure 10:
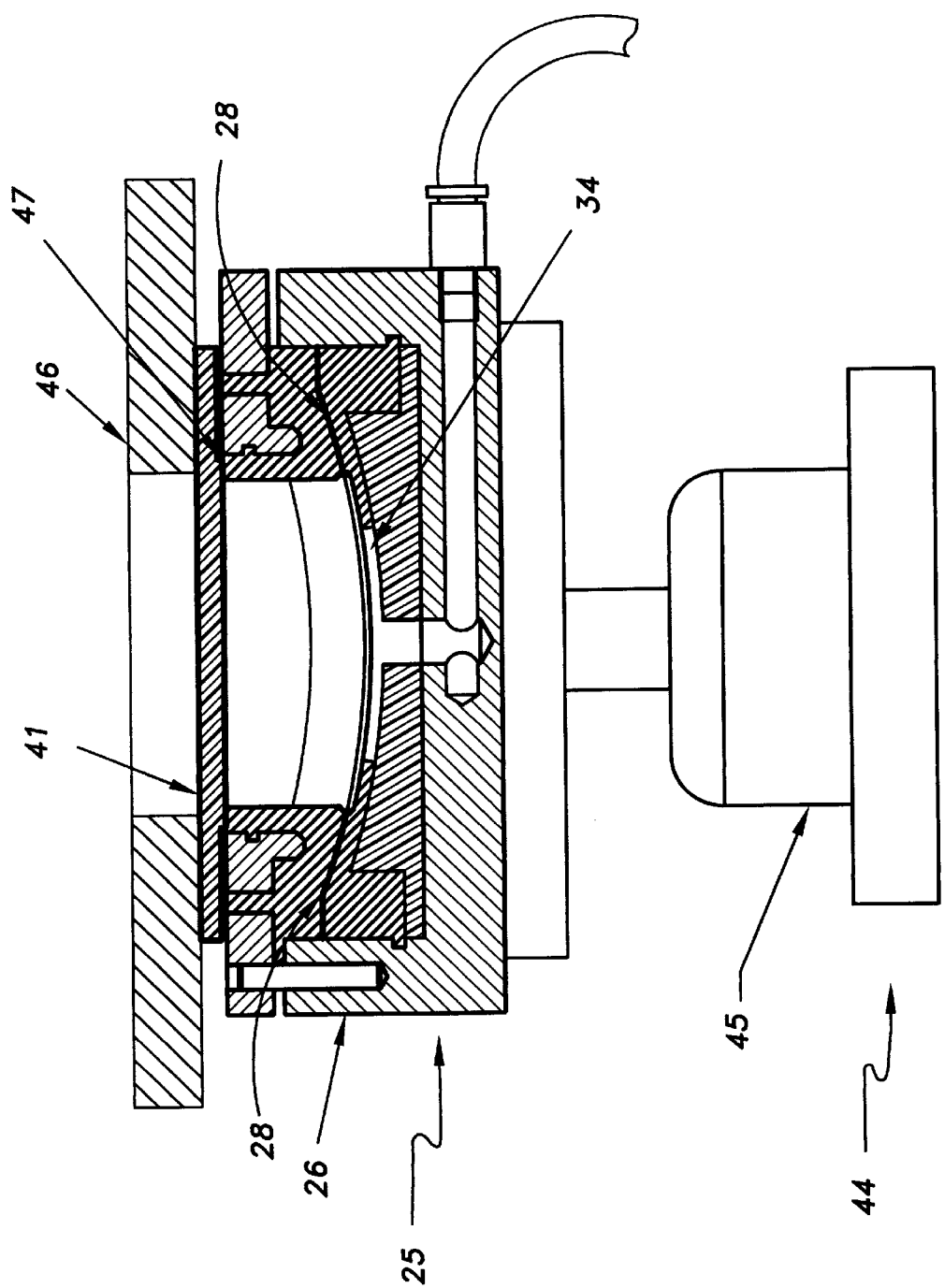
FIG. 10 is a cross-section of a split mold situated between a compression cylinder and a fixed platen.

Split mold 25 containing device 8 is then positioned between fixed platen 46 and cylinder 45 of compressing means 44, as shown in FIG. 10. Compressing means 44 comprises an electrically or pneumatically driven cylinder 45 which pushes split mold 25 against fixed platen 46. This action causes extended surface 42 of top plate 41 to compress pliable portions 37 and 39 of split mold 25, which in turn seals upper and lower pliable portions 39 and 37 against each other along split line 28 and against device 8. Alternatively, top plate 41 can be an integral portion of fixed platen 46. During this process, vacuum is preferably applied to vacuum chamber 34, which seals front expanse surface 3 of device 8 against support ledge 35.

Epoxy sealant is then injected into mold cavity 58 (see FIG. 9) through an injection conduit (not shown). The injection conduit passes through the injection sprue formed by sprue mold 53. Air escapes mold cavity 58 via an outlet conduit (not shown), which passes through the outlet sprue formed by sprue mold 54. Needles are preferred injection and outlet conduits. Injection may be assisted via vacuum as described earlier relative to single piece mold 20. After mold cavity 58 is filled, the sealant is cured for an effective cure time. The mold is then disassembled, resulting in sealed device 8.

Figure 11:
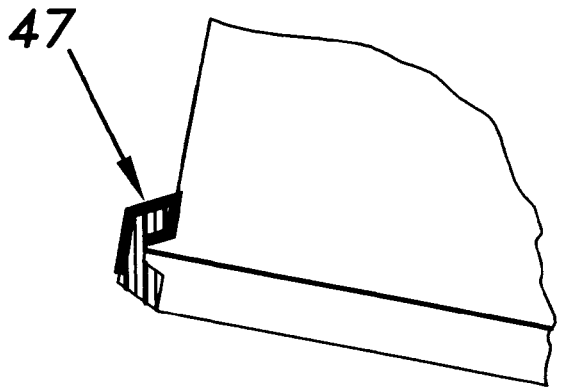
FIG. 11 is a cross-section of a laminated electrochromic lens showing rear lens electrical connector orientation after sealing using a one piece mold.
Figure 12:
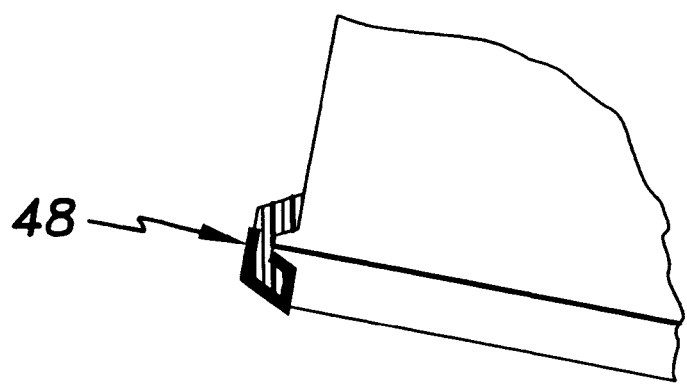
FIG. 12 is a cross-section of a laminated electrochromic lens showing front lens electrical connector orientation after sealing using a one piece mold.

It is noteworthy that electrochromic lenses may contain electrical contacts, or tabs. The tabs serve as electrical conduits between a power supply and the electroconductive layers of an electrochromic device. Tabs must protrude through a molded apex seal in order to establish electrical contact with a sealed lens. To prevent damage to the tabs during molding using single piece mold 20, rear tab 47 and front tab 48 can be positioned as shown in FIGS. 11 and 12. For split mold 25, device tabs can pass through split line 28, which obviates bending the tabs. Split mold 25 also facilitates easy removal of sealed devices, and lessens the likelihood of damage to an apex edge seal as a device is removed from a mold.

In a preferred embodiment, the split line of a mold is a three dimensional curve. The split mold assembly method described above provides such a split line, which ideally intersects the apex of a given edge seal. Molds which are split vertically instead of horizontally can also be used.

EXAMPLES

The present invention is more particularly described in the following Example, which is intended to be illustrative only since numerous modifications and variations therein will be apparent to those skilled in the art.

Sealing an Electrochromic Device

A laminated electrochromic device prepared substantially in accordance with Example I of U.S. Pat. No. 5,520,851 was inserted into a split mold in a manner that aligned the cavity of the mold with the ion-conducting polymer interlayer of the device. This split mold was fitted with a top plate having an extended surface that aligned with the pliable portion of the top half of the split mold. Pressure was applied to the pliable portions of the split mold by compressing the mold pneumatically against the top plate and a fixed platen. After application of vacuum to seal the bottom expanse surface of the device against the mold support ledge, Araldite® 2012 epoxy sealant was injected into the mold cavity via a needle that had been inserted through the mold wall into the mold cavity. The sealant was injected at the 6:00 position of the lens shape. To facilitate flow through the mold, a second needle attached to a vacuum line was inserted at the 12:00 position. The incoming epoxy stream split and filled the cavity in two directions. At the 12:00 position, the streams met at the vacuum needle. When epoxy was observed exiting the vacuum needle, the mold was full. After an effective cure time at ambient temperature and removal of the needles, the mold was opened and an apex-edge sealed device was removed.

We claim:

1. A method for applying a seal to a laminated electrooptic lens having a peripheral edge region situated between the expanse regions of first and second lens substrates, wherein said seal is applied to said peripheral edge region, which method comprises: a) inserting said laminated electrooptic lens into a pliable mold having a mold cavity shaped to form said seal; b) adding a sealant to said cavity; and c) removing said lens from said mold after curing said sealant.

2. The method of claim 1, wherein said mold is a single piece mold having a pliable portion.

3. The method of claim 1, wherein said pliable mold is a split mold having first and second pliable portions which interface along a split line.

4. The method of claim 3, wherein said first and second portions are compressed as said sealant is added to said cavity.

5. The method of claim 1, wherein vacuum helps to seal said lens against said pliable mold as said sealant is added to said cavity.

6. The method of claim 1, wherein said lens is a laminated electrochromic lens.

7. The method of claim 6, wherein said peripheral edge region comprises the outer surface of an interlayer prone to moisture gain or loss and wherein said seal is aligned with said interlayer.

8. The method of claim 1, wherein said mold cavity is formed using one or more mold master lenses.

9. The method of claim 6, wherein said mold cavity is formed using one or more mold master lenses.

10. The method of claim 3, wherein said lens contains at least one tab, and wherein said tab passes through said split line.

11. The method of claim 3, wherein said lens is a laminated electrochromic lens containing a tab.

* * * * *